(12) United States Patent
Ellerbrock et al.

(10) Patent No.: US 10,924,371 B2
(45) Date of Patent: Feb. 16, 2021

(54) METHOD FOR MONITORING A FIRST NODE IN A COMMUNICATIONS NETWORK AND MONITORING SYSTEM (71) Applicant: Beckhoff Automation GmbH, Verl (DE)

(72) Inventors: Oliver Ellerbrock, Vlotho (DE); Jens Sachs, Petershagen (DE); Robert Zutz, Verl (DE)

(73) Assignee: Beckhoff Automation GmbH, Verl (DE)

( * ) Notice: Subject to any disclaimer, the term of this patent is extended or adjusted under 35 U.S.C. 154(b) by 49 days.

(21) Appl. No.: 15/088,299

(22) Filed: Apr. 1, 2016

(65) Prior Publication Data

US 2016/0218946 A1 Jul. 28, 2016

Related U.S. Application Data (63) Continuation of application No. PCT/EP2015/073758, filed on Oct. 14, 2015.

(30) Foreign Application Priority Data

Oct. 14, 2014 (DE) ...................... 10 2014 114 883.5

(51) Int. Cl.
*H04L 12/26* (2006.01)
*G06F 11/07* (2006.01)
(Continued)

(52) U.S. Cl.
CPC ...... *H04L 43/0823* (2013.01); *G06F 11/0724* (2013.01); *G06F 11/0757* (2013.01);
(Continued)

(58) Field of Classification Search
None
See application file for complete search history.

(56) References Cited

U.S. PATENT DOCUMENTS 4,805,107 A * 2/1989 Kieckhafer ........... G06F 9/4881
714/15
5,477,458 A * 12/1995 Loomis ................... G01S 19/41
701/471
(Continued)

FOREIGN PATENT DOCUMENTS

CN 1373949 A 10/2002
CN 101960755 A 1/2011
(Continued)

OTHER PUBLICATIONS

English Translation of Chinese Search Report for Chinese Patent Application No. 201580004141.3, dated Aug. 16, 2017 (2 pages).

*Primary Examiner* — Christopher T Wyllie
(74) *Attorney, Agent, or Firm* — Dorsey & Whitney LLP (57) ABSTRACT

A method and corresponding system are described for monitoring a first node in a communications network by a second node, where the first node has a single-channel design and is designed to execute a safety-oriented application. The second node has a dual-channel design, and a safety protocol is used for a data transfer between the first and second node. The second node determines at each of two consecutive time points a time value based on an internal timer, and sends each determined time value to the first node. The first node in response to each receipt of the time values determines a further time value based on a further internal timer. The first node compares a difference between the two time values from the second node with a difference between the two further time values from the first node, and goes into an error state depending on the comparison.

13 Claims, 2 Drawing Sheets

(51) Int. Cl.
*H04J 3/06* (2006.01)
*H04L 12/24* (2006.01)

(52) U.S. Cl.
CPC ........ *H04J 3/0664* (2013.01); *H04L 41/0695* (2013.01); *H04L 43/0817* (2013.01); *H04L 43/106* (2013.01); *H04L 41/0681* (2013.01)

(56) References Cited

U.S. PATENT DOCUMENTS

| | | | | |
|---|---|---|---|---|
| 6,449,291 | B1* | 9/2002 | Burns | H04J 3/0655 370/516 |
| 6,829,717 | B1* | 12/2004 | Roust | G06F 1/12 370/506 |
| 8,549,136 | B2* | 10/2013 | Kalhoff | G05B 19/058 709/224 |
| 2004/0088406 | A1* | 5/2004 | Corley | H04L 41/064 709/224 |
| 2005/0232151 | A1* | 10/2005 | Chapweske | H04L 1/0002 370/231 |
| 2008/0150713 | A1* | 6/2008 | Kalhoff | G05B 19/048 340/532 |
| 2009/0161806 | A1* | 6/2009 | Ananny | G06F 13/4045 375/354 |
| 2012/0023277 | A1* | 1/2012 | Graf | G05B 19/4185 710/110 |
| 2012/0089861 | A1* | 4/2012 | Cardinell | G06F 11/0757 714/2 |
| 2013/0034197 | A1* | 2/2013 | Aweya | H03L 7/0991 375/362 |
| 2013/0111087 | A1* | 5/2013 | Kaufleitner | H04L 63/168 710/106 |
| 2013/0158681 | A1* | 6/2013 | Hamm | G05B 19/0428 700/79 |
| 2013/0195439 | A1* | 8/2013 | Mangin | H04Q 11/0067 398/2 |
| 2013/0254443 | A1* | 9/2013 | Sixt | H04L 12/40078 710/110 |
| 2013/0266306 | A1* | 10/2013 | Kozaki | H04L 7/0075 398/5 |
| 2014/0372840 | A1* | 12/2014 | Barthel | H04L 1/0045 714/807 |
| 2015/0071309 | A1* | 3/2015 | Aweya | H04J 3/0682 370/503 |

FOREIGN PATENT DOCUMENTS

| | | |
|---|---|---|
| CN | 103618383 A | 3/2014 |
| DE | 10361178 A1 | 12/2004 |
| DE | 102008007672 A1 | 7/2009 |
| DE | 102012023748 A1 | 6/2014 |
| EP | 2646100 A1 | 10/2013 |
| EP | 2797263 A1 | 10/2014 |
| WO | 2008053039 A1 | 5/2008 |
| WO | 2013094072 A1 | 6/2013 |
| WO | 2014090612 A1 | 6/2014 |

* cited by examiner

METHOD FOR MONITORING A FIRST NODE IN A COMMUNICATIONS NETWORK AND MONITORING SYSTEM

CROSS-REFERENCE TO RELATED APPLICATIONS

This application is a continuation of International Patent Application No. PCT/EP2015/073758, filed Oct. 14, 2015, which claims priority to German Patent Application DE 10 2014 114883.5, filed Oct. 14, 2014, each of which is incorporated by reference herein, in the entirety and for all purposes.

FIELD

The invention relates to a method for monitoring a first node in a communications network and to a monitoring system.

BACKGROUND

DE 10 2012 023 748 A1 discloses a method for synchronizing sensors, in which method a clock from a timer in the sensors is compared with a clock from a central timer in a control unit. DE 103 61 178 A1 discloses a communications network in which the nodes compare time offsets in time-stamped messages. EP 2 648 100 A1 discloses a process-monitoring device and an automation unit comprising such a device.

SUMMARY

The object of the invention can be considered that of providing an improved method for monitoring a first node in a communications network.

In addition, the object of the invention can be considered that of providing an improved monitoring system.

According to one aspect, a method for monitoring a first node in a communications network is provided. A second node of the communications network determines at each of two consecutive time points a time value, which is based on an internal timer of the second node, and sends each determined time value to the first node via the communications network. The first node, in response to each receipt of the sent time values, determines a further time value, which is based on a further internal timer of the first node, wherein the first node compares a difference between the two time values from the second node with a difference between the two further time values from the first node, wherein the first node goes into an error state depending on the comparison.

According to another aspect, a method for monitoring a first node in a communications network by a second node is provided. The first node has a single-channel design and is designed to execute a safety-oriented application, wherein the second node has a dual-channel design, and wherein a safety protocol is used for a data transfer between the first node and the second node on the communications network. The method comprising the steps:

determining in the dual-channel second node at each of two consecutive time points a time value (211), which is based on an internal timer of the dual-channel second node (205, 301), and the dual-channel second node sending each determined time value to the single-channel first node via the communications network (207), the single-channel first node receiving the sent time value and determining in response to the receipt a further time value (211), which is based on a further internal timer of the single-channel first node, with the result that two further time values are present in the single-channel first node, the single-channel first node comparing a difference between the two time values from the dual-channel second node with a difference between the two further time values from the single-channel first node (203, 401), wherein the single-channel first node goes into an error state depending on the comparison.

According to another aspect a monitoring system comprising a first node and a second node in a communications network is provided. The first node has a single-channel design comprising a processor, and is designed to execute a safety-oriented application. The second node has a dual-channel design comprising two processors, which monitor each other for malfunctions, and wherein a safety protocol is used for a data transfer between the first node and the second node on the communications network. The dual-channel second node further comprises an internal timer and a communications interface, wherein the one processor of the dual-channel second node is designed to determine a time value on the basis of the internal timer, and wherein the communications interface is designed to send the determined time values to the single-channel first node via the communications network. The first node comprises a further internal timer and a further communications interface, wherein the communications interface is designed to receive the time values from the dual-channel second node via the communications network, and wherein the processor of the single-channel first node is designed to determine, in response to each receipt of the sent time values from the dual-channel second node, a further time value based on the further internal timer, and to compare a difference between the two time values from the dual-channel second node with a difference between the two further time values from the single-channel first node, wherein the first node is designed to go into an error state depending on the comparison.

BRIEF DESCRIPTION OF THE DRAWINGS

The invention is explained in more detail below with reference to preferred exemplary embodiments, in which.

DETAILED DESCRIPTION

According to one aspect, a method for monitoring a first node in a communications network is provided, wherein a second node of the communications network determines at each of two consecutive time points a time value, which is based on an internal timer of the second node, and sends each determined time value to the first node via the communications network, wherein the first node, in response to each receipt of the sent time values, determines a further time value, which is based on a further internal timer of the first node, wherein the first node compares a difference between the two time values from the second node with a difference between the two further time values from the first node, wherein the first node goes into an error state depending on the comparison.

According to another aspect, a system for monitoring a first node of a communications network is provided, comprising:

a first node for the communications network and a second node for the communications network, wherein the second node comprises an internal timer, at least one processor, which is designed to determine a time value on the basis of the internal timer, and a communications interface, which is designed to send time values, which are determined by the at least one processor at two consecutive time points, to the first node via the communications network, wherein the first node comprises a further internal timer and a further communications interface, which is designed to receive the time values from the second node via the communications network, wherein the first node comprises a further processor, which is designed to determine, in response to each receipt of the sent time values from the second node, a further time value, which is based on the further internal timer, and to compare a difference between the two time values from the second node with a difference between the two further time values from the first node, wherein the first node is designed to go into an error state depending on the comparison.

According to one aspect, a node for a communications network is provided that comprises:

an internal timer, at least one processor, which is designed to determine a time value on the basis of the internal timer, and a communications interface, which is designed to send time values, which are determined by the at least one processor at two consecutive time points, to a further node via the communications network.

According to another aspect, a node for a communications network is provided that comprises:

an internal timer, a communications interface, which is designed to receive time values from a further node via the communications network, and a processor, which is designed to determine, in response to each receipt of the time values, a further time value, which is based on the internal timer, and to compare a difference between the two successively received time values with a difference between the two successively determined further time values, wherein the node is designed to go into an error state depending on the comparison.

To make a clearer distinction, the node that sends the time values to the further node via the communications network is referred to as the second node. The node that receives these time values is referred to as the first node. To make it easier to distinguish the node to which the timer, the communications interface and the processor belong, in the description the prefix "further" is added to the timer, the communications interface and the processor of the first node.

Comments made in connection with the method apply analogously also to the system and to the nodes. This means that features, advantages and embodiments of the method arise analogously from the corresponding embodiments of the system or of the nodes, and vice versa.

Thus the invention includes in particular the idea that a second node of the communications network sends time values, which are determined at two consecutive time points, to the first node via the communications network. This first node forms a difference in these two time values, i.e. a delta ($\Delta$). In addition, said first node itself determines further time values, which time values are associated with the respective receive times of the sent time values from the second node. Again in this case, the first node forms a corresponding difference, i.e. a delta ($\Delta$), from the time values it has determined. The first node compares these two differences. The first node goes into an error state depending on the comparison.

Since the determined time values are based on the internal timer of the first node and of the second node, comparing the corresponding differences in the time values advantageously makes it possible to check whether the two internal timers of the two nodes are running synchronously or whether the further internal timer of the first node is running faster or slower than the internal timer of the second node. This advantageously allows monitoring of the internal timer of the first node. This is achieved solely by the second node transmitting to the first node time values that are based on the internal timer of said second node. Thus this means in particular that for checking the further internal timer of the first node, the communications network does not need to comprise an additional, separate external master clock, in other words a separate external timer. Instead, the internal timer of the second node is used for this purpose. By virtue of comparing corresponding differences with each other, it is advantageously no longer necessary for absolute time values to have to be transmitted. The sent time value therefore does not need to include an absolute date. This reduces a corresponding volume of data to be sent.

The time value determined at a time point equals in particular a counter value, which is incremented or decremented on the basis of the internal timer of the first node or second node. Thus this means in particular that the second node determines at two consecutive time points a corresponding counter value, and then sends these counter values to the first node. The first node itself determines at the respective receive times of these counter values an internal counter value of a further internal counter of the first node, which is incremented or decremented on the basis of the further internal timer. The respective timers provide a clock, for instance a millisecond clock, for the incrementing or decrementing.

If the two internal timers of the two nodes are running synchronously with each other, then the two counters should have been incremented or decremented by the same amount, within the bounds of accuracy given by measurement tolerances or random or systematic errors. If the two differences differ by a defined threshold value, however, it is assumed that the two internal timers are no longer running synchronously with each other, with one running faster or slower than the other. In this case it is then provided particularly that the first node goes into an error state. Said defined threshold value depends, for example, on the specific application.

According to one embodiment, the threshold value for triggering the error state depends on a time resolution of the two internal timers. In order to determine the threshold value, the smallest common unit of time of the two internal timers is preferably used, such as, for instance, 1 ms, particularly 10 ms or also preferably 100 ms, and the smallest common unit of time is increased by a percentage value, for example by 20%, particularly by 30%. Thus a time safety margin is applied to the smallest unit of time. The increased common unit of time forms the threshold value. If the difference in two consecutive timer values or time values differs by more than the smallest common unit of time increased by the percentage value, so for instance by more than 20%, the error state is assumed and the first node hence goes into an error state.

According to one embodiment, the time values from the second node are determined at a defined time interval from respective send times of the time values. This achieves in particular the technical advantage that any jitter in the timer generation can be minimized. This is by virtue of delaying until the defined time interval before the transmission of the time value, when the current time value or counter value of the counter is then used. The defined time interval lies particularly in the microsecond range, particularly in a range of 1 µs to 1000 µs, for example between 1 µs and 500 µs, in particular between 1 µs and 100 µs, preferably between 1 µs and 10 µs.

In another embodiment, the second node has a dual-channel design and the first node has a single-channel design. This achieves in particular the technical advantage that for the second node, there is an increased likelihood that the second node detects for itself internal errors or malfunctions. This is thanks to the dual-channel design. In particular the second node has increased redundancy and reliability. Since the second node already has a dual-channel design, this need not necessarily also still be the case for the first node. It is sufficient in this case for said node to have a single-channel design. This simplifies a corresponding system design. In particular, the first node can be produced more cheaply. For example, it can be in the form of a standard "personal computer" (PC). In particular, the second node comprises two processors, in particular two microprocessors, for example two microcontrollers. In contrast, the first node preferably comprises a single processor. The two processors of the second node are thus designed in particular to monitor each other for malfunctions. If one of the processors has a malfunction, the other processor of the second node can still perform functions of the first processor. Both processors are designed particularly to determine the relevant timer values or time values.

In another embodiment, it is provided to send the time values on the basis of the Safety over EtherCAT protocol. This achieves in particular the technical advantage that the time values are transmitted on the basis of a safety protocol that in particular is SIL3-certified. The acronym SIL here stands for Safety Integrity Level. Safety over EtherCAT is internationally standardized in IEC 61784-3-12.

According to another embodiment, the second node sends the time values to the first node regardless of any module error associated with an electronic module connected to the second node. This achieves in particular the technical advantage that the second node sends the time values to the first node even in the event of a module error. Thus even in the event of a module error, the first node can check its internal timer on the basis of the sent time values from the second node. This advantageously ensures that it is still possible to monitor the first node even in the event of a module error.

For example, an electronic module is an actuator or a sensor which is connected to the second node. In other words, the second node reads the sensor or controls the actuator. If an error occurs during the control operation or read operation, for example, this is referred to as a module error. In particular if the sensor or actuator has a malfunction, then this is also referred to in particular as a module error. Thus this means that in the event of any fault in the electronic module or in the event of an error occurring in a control operation or a read operation on the electronic module, this has no effect on determining the time values nor on sending these time values. This means that the second node, regardless of such errors, determines or generates relevant time values and sends these time values to the first node via the communications network. A module error may include, for instance, a fault in external wiring for the module. The time value is thus still generated in particular regardless of such module errors. According to one embodiment, module errors can be detected by means of an input terminal and/or output terminal of a bus terminal system, where the terminals are nodes of the communications network.

According to one embodiment, the communications network is an EtherCAT communications network. According to one embodiment, in general the communications network is a Fieldbus communications network, in particular it is a Profibus or a Profinet communications system.

According to one embodiment, an automation system is provided that comprises the system according to the invention. The automation system is, for example, part of a production facility, in particular of an industrial production facility. The automation system is part of a building automation system, for instance.

According to one embodiment, a safety-oriented application is executed in the first node, or the first node, particularly the further processor, is designed to execute a safety-oriented application. This is done in particular on the basis of the further internal timer of the first node. This means thus in particular that the further internal timer of the first node adopts a timing clock for running or executing the safety-oriented application. It is particularly important here that the further internal timer of the first node works correctly, i.e. is running neither too slow nor too fast. This is because this is particularly important for timing characteristics of switch-on and/or switch-off delays, which are often used in safety-oriented applications. The comparison according to the invention of the time values (i.e. in this case comparing the corresponding differences) can advantageously be used to ensure that the internal timer of the first node does not slow down or speed up inadmissibly, which could result in it no longer being possible to run correctly the safety-oriented application that is executed in the first node.

The design of the first node to go into an error state depending on the comparison includes in particular the case in which the further processor of the first node is designed to go into an error state depending on the comparison.

The error state means, for example, that execution of the safety application in the node is stopped, with communication to the external nodes also being suspended, for example, so that after a definable watchdog time, these nodes likewise switch into the safe state and switch off the outputs.

The steps of determining the time value, sending the time value to the first node, and, in response to the receipt, the first node determining a further time value are performed, according to one embodiment, successively in a cyclical manner. In particular in this case, the cycle corresponds to a data transfer cycle of the communications network. According to one embodiment, the time value or counter value to be sent is packaged or inserted into a message, which is sent to the first node via the communications network in accordance with the transfer cycle. It is preferably provided to delay determining the counter value or time value until a defined time interval from a message transmission, so that it is advantageously possible to send to the first node a counter value that is as recent as possible. The defined time interval lies in the microsecond range for instance. This achieves in particular the technical advantage that any jitter in generating or determining the time value or counter value can be minimized.

Figure 1:
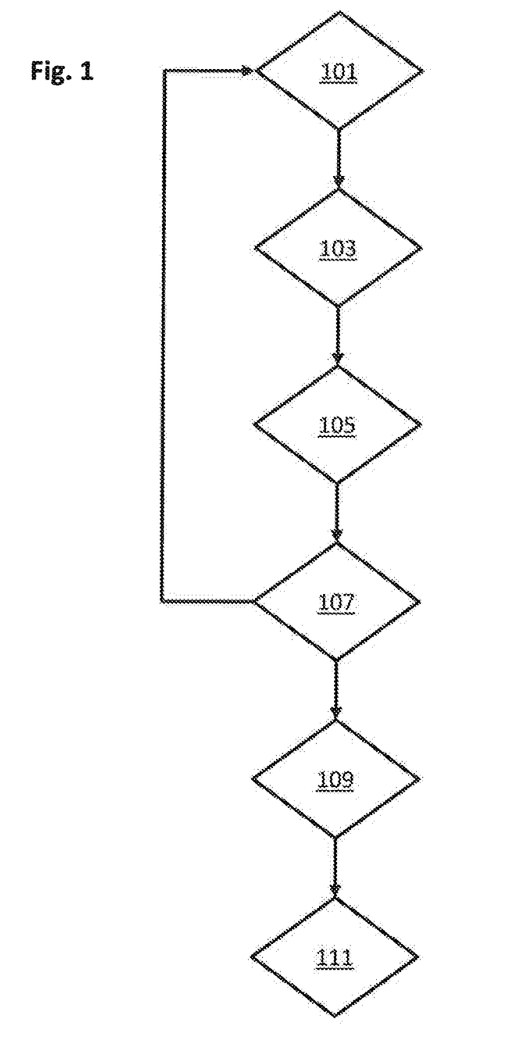
FIG. 1 is a flow diagram of a method for monitoring a first node of a communications network.

FIG. 1 shows a flow diagram of a method for monitoring a first node of a communications network.

According to a step 101, a second node of the communications network determines at a first time point a time value based on an internal timer of the second node. This time value, for example, corresponds to a counter value of an internal counter of the second node, where the internal counter is incremented or decremented in accordance with the clock provided by the internal timer.

In a step 103, the second node sends the determined time value, so for instance the counter value at the first time point, to the first node via the communications network. In a step 105, the first node receives this time value, where in response to the receipt the first node determines a further time value according to a step 107. This is done on the basis of a further internal timer of the first node. For example, this further time value also corresponds to a counter value of an internal counter of the first node at the time of receiving the time value of the second node as given by the step 105. This internal counter is incremented or decremented on the basis of the further internal timer.

Steps 101 to 107 are performed successively in a cyclical manner. In particular in this case, the cycle corresponds to a data transfer cycle of the communications network. The time value or counter value to be sent is packaged or inserted into a message, which is sent to the first node via the communications network in accordance with the transfer cycle. It is preferably provided to delay determining the counter value until a defined time interval from a message transmission, so that it is advantageously possible to send to the first node a counter value that is as recent as possible. The defined time interval lies in the microsecond range for instance. This achieves in particular the technical advantage that any jitter in generating or determining the time value or counter value can be minimized.

Once the steps 101 to 107 have been performed twice, the first node then has available two time values or counter values from the second node that were determined at two consecutive time points. In addition, the first node also has available two further time values or counter values, which correspond to those counter values at the respective receive times. In a step 109, the first node compares a difference between the two time values from the second node with a difference between the two further time values from the first node. Thus this means that the first node forms a difference between the two time values from the second node. The first node also forms a difference between the two further time values from the first node. These two differences are compared with each other. In the ideal case, when the two internal timers of the two nodes are running synchronously with each other, the two differences should be equal. If, on the other hand, the further internal timer of the first node is running faster or slower than the internal timer of the second node, then there is disparity in the respective differences. Should this disparity be greater than a predetermined threshold value, it is provided according to step 111 that the first node goes into an error state. This threshold value depends in particular on the specific application and must take into account particularly parameters such as transfer rate, transmission path and jitter, for example. This is why there is the threshold value, because typically the ideal case rarely occurs in a real environment.

Thus the method according to the invention advantageously makes it possible for a second node of the communications network to monitor the first node to check that the internal timer of the first node is not running faster or slower than the internal timer of the second node. This is especially important and particularly advantageous in particular when a safety-oriented application is being executed in the first node and said execution is performed on the basis of a clock provided by the further internal timer. Such execution may be, for example, switching on or switching off specific actuators or final control elements that are controlled on the basis of the safety-oriented application. By virtue of the timer of the second node being used to monitor the synchronous behavior of the timer of the first node, it is advantageously no longer necessary to provide a master clock or master timer that is formed separately from the two nodes. Since corresponding differences are being compared here, it is hence no longer necessary for absolute time information to be transmitted via the communications network. This reduces a corresponding volume of data.

In one embodiment, the communications network is a Fieldbus communications network. This Fieldbus is an EtherCAT Fieldbus, for example. The protocol that is used to send the time values to the first node via the communications network is a Safety over EtherCAT protocol, for instance. This protocol has the advantage in particular of being a SIL3-certified protocol, i.e. a safety protocol. It is generally provided according to one embodiment that communication via the communications network is performed on the basis of the Safety over EtherCAT protocol.

Figure 2:
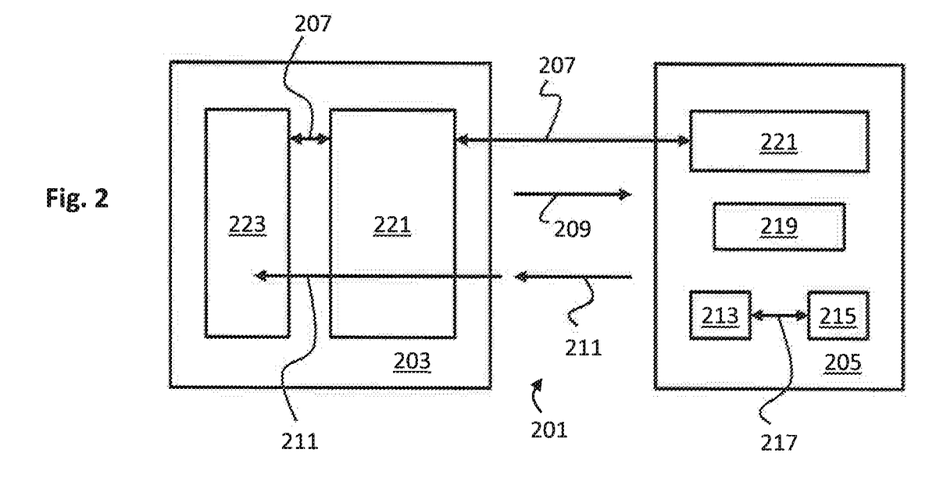
FIG. 2 shows a system for monitoring a first node of a communications network.

FIG. 2 shows a system 201 for monitoring a first node of a communications network.

The system 201 comprises a first node 203 and a second node 205. For communication via the communications network 207, which is a Fieldbus communications network for instance, the two nodes 203, 205 each comprise a communications interface. Communication between the two nodes 203, 205 is performed on the basis of a safety protocol, for instance on the basis of the Safety over EtherCAT protocol in this case. The reference sign 209 points to an arrow which symbolizes a data transfer from the first node 203 to the second node 205 via the Fieldbus 207. Similarly, the reference sign 211 points to an arrow which symbolizes a data transfer from the second node 205 to the first node 203 via the Fieldbus 207. This data transfer 211 transmits both data, for instance payload data, and time values or counter values that the second node 205 has determined as already explained in this description.

The second node 205 has a dual-channel design. This means that the second node 205 comprises two processors 213, 215, which can be designed as microprocessors or microcontrollers, for instance. In addition, the second node 205 comprises an internal timer 219. The internal timer 219 is a millisecond timer, for example. The internal timer 219 provides a clock, for example a millisecond clock, on the basis of which a counter is incremented or decremented. At consecutive time points, the counter value at each time point is sent via the Fieldbus 207 to the first node 203 in accordance with the data transfer 211. This uses a safety protocol 221, which in this case is the Safety over EtherCAT protocol, for example. It is preferably provided to delay determining the relevant counter value until a defined time interval from the time of the data transfer or message transmission 211. A counter value that is as recent as possible is thus advantageously used for sending to the first node 203.

The first node 203 receives these counter values in succession and determines in response to each receipt a counter value of an internal counter of the first node 203, which internal counter is incremented or decremented on the basis of a further internal timer of the first node 203. This further internal timer of the first node 203 is intended to provide a clock that is the same as, or proportional to, the internal timer 219 of the second node 205. Thus this means that there is meant to be at least a defined relationship between the respective clocks.

In order now to determine whether the clock of the further internal timer of the first node 203 is running faster or slower than the clock of the internal timer 219 of the second node 205, it is provided according to the invention that a processor 223 of the first node 203 forms respective differences for the respective time values or counter values, and compares said differences with each other. Should the differences have a disparity that is greater than a defined threshold value, then the processor 223 and hence also the node 203 goes into an error state. The first node 203 has a single-channel design in that it has a single processor 223, although this processor can certainly have a plurality of cores in embodiments that are generally independent of this specific exemplary embodiment.

Figure 3:
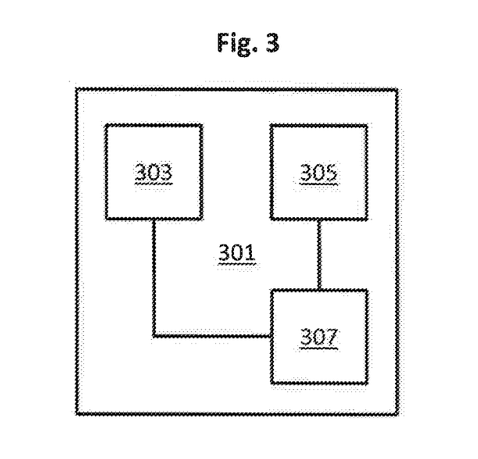
FIG. 3 shows a node for a communications network.

FIG. 3 shows a node 301 for a communications network. The node 301 is an embodiment of a second node for the communications network.

In general, such a node 301 comprises a communications interface 303, an internal timer 305 and a processor 307. The internal timer 305 provides a clock. The processor 307 is designed to determine a time value on the basis of the internal timer. The communications interface 303 is designed to send via the communications network time values, which are determined by the processor 307 at two consecutive time points, to a further node, for example to the first node of the communications network, for instance the node 203 as shown in FIG. 2.

Figure 4:
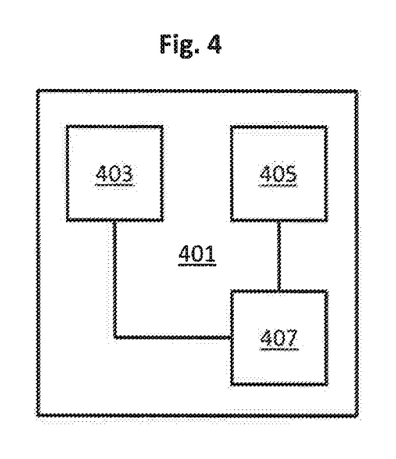
FIG. 4 shows a further node for a communications network.

FIG. 4 shows a further node 401 for a communications network. The node 401 shown in FIG. 4 is a first node in the sense of this description. For example, the node 401 is the node 203 shown in FIG. 2.

In general, such a node 401 has the following design. It comprises a communications interface 403, which can be referred to as a further communications interface to make a distinction from the communications interface of the second node 301 shown in FIG. 3.

The node 401 also comprises an internal timer 405, which can likewise be referred to as a further internal timer to make said internal timer more easily distinguishable from the internal timer 305 of the node 301.

The node 401 also comprises a processor 407, which can be referred to likewise as a further processor to make a distinction from the processor 307.

The further communications interface 403 is designed to receive time values from a further node, for example from the node 301, via the communications network. The processor 407 is designed to determine, in response to each receipt of the time values, a further time value, which is based on the internal timer 405, and to compare a difference between the two received time values with a difference between the two further time values. The node 401, in particular the processor 407, is designed to go into an error state depending on the comparison.

Thus the invention includes in particular the idea of providing a method that can be used to monitor a single-channel safe system (first node) by transmitting timer values (time values or counter values) from a dual-channel safe system (second node). It is particularly provided that a safety protocol (in this case FSoE, Safety over EtherCAT) is used to transfer data between a PC installed with a PC-based safety runtime component (first node) and a safety-oriented device (second node) in a safe (SIL3) manner. A Fieldbus (preferably also Ethernet-based) is used for communication between these devices.

Data is transferred cyclically between the two devices by means of the safety protocol. A timer value is additionally transmitted in the channel from the safety device to the single-channel device. This timer value is generated by the safety device, which has a dual-channel design.

The PC-based safety runtime component has its own timer, which is compared with the transmitted timer value. If this CPU establishes that the timer values are diverging inadmissibly, the CPU goes into an error state.

This comparison of the timer values is needed to ensure that the timer of the single-channel system does not slow down or speed up inadmissibly and thereby prevent the safety-oriented application, which is executed in said system, from being able to execute correctly. This is particularly important for the timing characteristics of switch-on and/or switch-off delays, which are often used in safety-oriented applications.

The timer generation function is activated, for example, by the definition of the process image of the safety device.

The timer is generated by a high-priority timer task on one of the two µC (microcontrollers) of the second node. The two microcontrollers monitor each other, with the result that any malfunction in the hardware and/or software is detected (SIL3). The determined timer value is packaged into the safety protocol and transmitted to the single-channel system (first node) in the next FSoE communication cycle.

In order to minimize the jitter in the timer generation, it is preferable to delay until shortly before message transmission (defined time interval) and then to use the current timer value.

Timer generation preferably still continues even in the event of a module error in the safety device.

A safety protocol, for instance in this case FSoE (IEC61784-3-12), which is SIL3-certified, is used for the transmission.

Thus this invention describes a timer value (from the second node), which can be provided at SIL3 quality to a single-channel safe system (first node).

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for monitoring a first node in a fieldbus communications network by a second node, wherein the second node of the fieldbus communications network determines at two consecutive time points first and second time values, which are based on an internal timer of the second node, and sends the first and second time values to the first node via the fieldbus communications network, the first and second time values equaling first and second counter values, respectively, which are incremented or decremented on the basis of the internal timer of the second node, each counter value being inserted into a respective message, the messages being sent successively to the first node in accordance with a transfer cycle, the second node having a dual-channel design comprising two processors which monitor each other for malfunctions, both processors determining the first and second time values, wherein the first node, in response to receipt of the first and second time values, determines third and fourth time values, which are based on a further internal timer of the first node, the third and fourth time values equaling third and fourth counter values, respectively, which are incremented or decremented on the basis of the further internal timer of the first node, wherein the first node compares a difference between the first and second time values from the second node with a difference between the third and fourth time values from the first node, and wherein the first node executes a safety-oriented application on the basis of a clock provided by the further internal timer and goes into an error state if the respective differences differ by a defined threshold value, wherein the threshold value depends on the safety-oriented application and one or more respective parameters selected from transfer rate, transmission path, and jitter, and wherein the error state indicates or signifies that execution of the safety-oriented application in the first node is stopped.

2. The method as claimed in claim 1, wherein the first node has a single-channel design.

3. The method as claimed in claim 2, wherein the time values from the dual-channel second node are determined at a defined time interval from the respective send times of the time values.

4. The method as claimed in claim 2, wherein the dual-channel second node sends the time values to the single-channel first node regardless of a module error associated with an electronic module connected to the dual-channel second node.

5. The method as claimed in claim 1, wherein a safety protocol is used for a data transfer between the first node and the second node on the communications network, the safety protocol being a Safety over EtherCAT protocol.

6. A method for monitoring a first node in a fieldbus communications network by a second node, wherein the first node has a single-channel design and executes a safety-oriented application, wherein the second node has a dual-channel design, and wherein a safety protocol is used for a data transfer between the first node and the second node on the fieldbus communications network, comprising the steps:

determining in the dual-channel second node at two consecutive time points first and second time values, which are based on an internal timer of the dual-channel second node, and the dual-channel second node sending the first and second time values to the single-channel first node via the fieldbus communications network, the single-channel first node receiving the first and second time values and determining in response to receipt of the first and second time values, third and fourth time values, respectively, which are based on a further internal timer of the single-channel first node, such that the third and fourth time values are present in the single-channel first node, the single-channel first node comparing a difference between the first and second time values from the dual-channel second node with a difference between the third and fourth further time values from the single-channel first node, wherein the single-channel first node executes the safety-oriented application on the basis of the further internal timer of the first node and goes into an error state if a disparity in the difference between the first and second time values from the second node and the difference between the third and fourth time values from the first node is greater than a predetermined threshold value, the threshold value depending on the safety-oriented application and one or more respective parameters selected from transfer rate, transmission path, and jitter, wherein the error state indicates or signifies that execution of the safety-oriented application in the first node is stopped.

7. The method as claimed in claim 6, wherein the time values from the dual-channel second node are determined at a defined time interval from the respective send times of the time values.

8. The method as claimed in claim 6, wherein the safety protocol is the Safety over EtherCAT protocol.

9. The method as claimed in claim 6, wherein the dual-channel second node sends the time values to the single-channel first node regardless of a module error associated with an electronic module connected to the dual-channel second node.

10. A monitoring system comprising a first node and a second node in a fieldbus communications network, wherein the first node has a single-channel design comprising a processor, and executes a safety-oriented application, wherein the second node has a dual-channel design comprising two processors, which monitor each other for malfunctions, and wherein a safety protocol is used for a data transfer between the first node and the second node on the fieldbus communications network, wherein the dual-channel second node further comprises an internal timer and a communications interface, wherein one processor of the dual-channel second node determines a time value on the basis of the internal timer under monitoring of the other processor of the dual-channel second node, and wherein the communications interface sends the determined time values to the single-channel first node via the communications network, wherein the first node comprises a further internal timer and a further communications interface, wherein the communications interface receives the time values from the dual-channel second node via the communications network, and wherein the processor of the single-channel first node determines, in response to each receipt of the sent time values from the dual-channel second node, a further time value based on the further internal timer, and compares a difference between the two time values received from the dual-channel second node with a difference between the two further time values determined by the single-channel first node, wherein the first node goes into an error state if the respective differences differ by a defined threshold value, the threshold value depending on execution of a safety-oriented application in the first node and one or more respective parameters selected from transfer rate, transmission path, and jitter, wherein the error state indicates or signifies that the execution of the safety-oriented application in the first node is stopped.

11. The monitoring system as claimed in claim 10, wherein the one processor of the dual-channel second node determines the time values from the dual-channel second node at a defined time interval from respective send times of the time values.

12. The monitoring system as claimed in claim 10, wherein the safety protocol is the Safety over EtherCAT protocol.

13. The monitoring system as claimed in claim 10, wherein the dual-channel second node sends the time values to the single-channel first node regardless of a module error associated with an electronic module connected to the dual-channel second node.

\* \* \* \* \*